Oct. 6, 1959 R. G. SEIDENSTICKER 2,907,969

PHOTOELECTRIC DEVICE

Filed Feb. 19, 1954

WITNESSES

Edwin E. Bassler

Charles X. Renz

INVENTOR

Raymond G. Seidensticker

BY F. E. Browder

ATTORNEY

United States Patent Office 2,907,969

Patented Oct. 6, 1959

2,907,969

PHOTOELECTRIC DEVICE

Raymond G. Seidensticker, Pittsburgh, Pa., assignor to Westinghouse Electric Corporation, East Pittsburgh, Pa., a corporation of Pennsylvania Application February 19, 1954, Serial No. 411,369

3 Claims. (Cl. 338—15)

My invention relates to photosensitive devices, and, more particularly, to photocells employing semiconductive material.

There are several types of semiconductive photosensitive devices or photo-transistors already in use. In one of these devices known as a point-contact unit, a pointed probe is placed on a wafer of semiconductive material. It is well known that if light is directed upon the region of contact of the pointed electrode or probe on the surface of the semiconductive material wafer that photoelectric effects are obtained. The photoelectric effects are evidenced by both the photovoltaic effect and the photoconductive effect. The photoconductive effect is noted only when voltage is applied in reverse direction. The photoconductive effect may be utilized to control an electric current passing between the point-contact electrode and the semiconductive wafer. The sensitive area of the point-contact photo-device is small and of the order of 10 mils in diameter. Because of the small sensitive area and the fact that there is little amplification of the light input, the magnitude of the effect is very limited.

Another type of photo-device is the simple P–N junction type photocell which also exhibits a similar photoelectric effect as that described with respect to the point-contact device at the barrier or junction region between the P and N regions with a reverse voltage applied for the photoconductive effect. The P–N junction type photocell, although providing a larger sensitive area than the point-contact device, is also limited in amplification.

Another type of device is an N–P–N photo-transistor which also exhibits similar photoelectric effects as described with respect to the P–N junction device. The N–P–N device is operated with one of the junctions biased in a reverse direction, and the other junction biased in a slightly forward direction. This is of a similar nature to the related transistor structure which is known as the "hook" collector and operates in a similar manner to obtain a large current amplification. A description of the operation of the "hook" collector type device is found on page 114 in the book "Electrons and Holes in Semiconductors," by William Shockley.

The sensitive area in the N–P–N device is restricted to the region near the junction. The semiconducting element may measure 1 mm. by 1 mm. by 4 mm. The sensitive area would be only of the order of 0.1 mm. in width and 1 mm. in length.

An N-type semiconductive material is defined as having conduction characteristics resulting from a predominance of electron conduction carriers in the semiconductive material over hole conduction carriers. The N-type semiconductive material usually results from the presence of one type of significant impurities, such as phosphorous, antimony and arsenic, which are referred to as donors. These donor impurities, having more valence electrons than the semiconductive material, donate or furnish excess electrons to the semiconductive material.

A P-type semiconductive material is a material having conduction characteristics usually resulting from a predominance of hole-type conduction carriers over electron conduction carriers within the semiconductive material. The P-type semiconductive material is obtained usually from the presence of a second type of impurity, such as gallium, indium, aluminum, which are referred to as acceptors. These acceptor impurities, having fewer valence electrons than the semiconductive material, function to absorb or accept electrons from the semiconductive material to produce electron vacancies or holes therein.

The present invention provides an improved "hook collector" photo-device in which the width of the region between the two junctions which causes the "hook" is precisely controlled in both thickness and conductivity, and may be made extremely thin so as to permit high current amplification of the light impressed on a photoelectric device of my invention.

It is an object of my invention to provide an improved semiconductive material-type photocell.

It is another object to provide an improved semiconductive material-type photocell utilizing a hook-type collector and having a large sensitive area.

It is another object to provide a photoelectric device that for each quantum of light absorbed by the photoelectric device a large number of electrons may flow through the device.

It is another object to provide an improved photoconductive device which is simple to manufacture.

It is another object to provide an improved type of photocell which simultaneously functions as a photosensitive device and a high gain amplifier.

These and other objects have been effected by my invention as will be apparent from the following description taken in accordance with the accompanying drawings, throughout which like reference characters indicate like parts, and in which.

Figure 1:
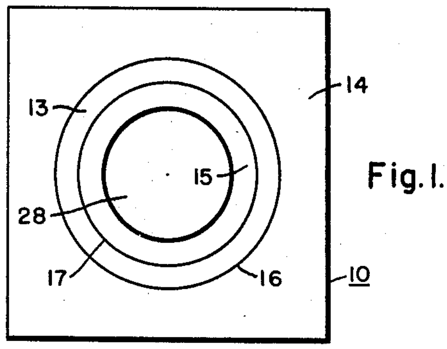
Figure 1 is a top view of a photocell embodying one form of my invention.
Figure 2:
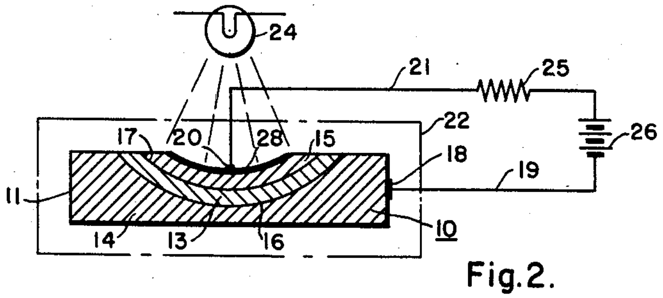
Fig. 2 is a sectional view of a photocell such as shown in Fig. 1.

Referring in detail to Figs. 1 and 2, a photoelectric device is shown. The device comprises a body or wafer 10 of a semiconductive material such as germanium or silicon. The wafer 10 is comprised of a plurality of definite zones or regions 14, 13 and 15 along the thickness dimension 11 of the wafer 10. The layers 13, 14, 15 may be designated as an intermediate layer 13 of one type conductivity, such as an N-type semiconductive material, a base layer or region 14 of an opposite type conductivity, such as a P-type semiconductive material forming a junction 16 between the layers 13 and 14, and a collector region or layer 15 contiguous with the intermediate layer 13 and of similar conductivity to region 14, such as a P-type material froming a junction 17 between the layers 13 and 15.

An ohmic connection 18 is made to the base region 14, with a lead 19 provided for connection to a suitable circuit. An ohmic connection 20 is also provided for the collector region 15, with suitable lead 21 also provided.

The unit may be incased in a material 22 transparent to visible light, such as plastic for protection in handling of the device. It is also within the broader aspects of my invention to incase the unit in material having suitable transmission characteristics for other than visible light. Radiation or light from a source 24 is directed onto the film 28.

The leads 21 and 19 are connected together through a series combination of a resistor 25 and an alternating or direct-current source 26. The source or battery 26 biases the P–N junctions 16 and 17 in the desired directions. The device shown in Fig. 2 is biased for an N–P–N structure.

The semiconductive body 10 may be prepared in the manner described in detail in U.S. Patent 2,836,521, Hook Collector and Method of Producing Same, dated May 27, 1958, by Richard L. Longini and assigned to the present assignee.

In brief, an alloying process, described in the above application, is utilized for making the junctions and may be accomplished in the following manner. A body or wafer of single-crystal semiconductive material, such as germanium, which has been doped with a P-type or acceptor impurity is used for the base of the device. The concentration of the P-type impurity should be such that the ratio of holes to electrons in the material is large, e.g., in the case of germanium, the resistivity of the material is about 0.01 ohm-centimeter. The thickness of the wafer is not critical and may be from 0.010 inch to 0.050 inch. The other dimensions of the wafer are also not critical and may be of the order of 0.25 inch by 0.25 inch. Before use in constructing my device, the wafer should be etched by a suitable etching solution such as described in U.S. Patent to R. H. Wynne, Jr., No. 2,653,085, dated September 22, 1953.

An intermetallic alloy is then made by melting indium, a P-type impurity, and arsenic, an N-type impurity, to provide an alloy having a small concentration of arsenic. Other suitable materials may be used as well as those mentioned above. A piece of this alloy is now flattened and placed on a suitable semiconductor wafer such as described above. The unit comprising the semiconductor base and the alloy material is now heated to a sufficient temperature such that the alloy melts and dissolves some of the base material. In the case of germanium bases, this temperature may be of the order of 600° C. When the alloy has dissolved an equilibrium amount of germanium, the temperature of the unit is lowered about 20° C. in such a manner that the base material is cooler than the molten alloy. This temperature gradient causes the germanium which crystallizes out of the melt to redeposit itself on the base material in such a way as to continue the crystal structure of the base material. This recrystallized germanium now contains equilibrium amounts of indium and arsenic. The unit is held at this temperature for several hours, the exact time depending upon the characteristics desired in the finished unit. During this holding time, the indium and arsenic diffuse from the redeposited material to the base material, with the arsenic diffusing approximately 5 to 10 times as fast as the indium. As a result, the arsenic will convert a region of the base material from the original P-type conductivity to N-type material having a resistivity of about 0.04 ohm-centimeter. The arsenic will not be neutralized in this effect by the slow diffusing indium, however, nearer the alloy melt the indium will predominate and cause the germanium to be P-type with a resistivity of the order of 0.001 ohm-centimeter. As a result, by a single alloy diffusion process one obtains a thin but well controlled N-type region 13 formed by the arsenic between the P-type base material 14 and the P-type collector layer 15 formed by the indium impurity.

To make one form of my device as shown in Figs. 1 and 2, the process of cooling the unit to room temperature from the temperature at which the diffusion was carried out should be done such that the base material is warmer than the alloy. With this sort of a temperature gradient, the additional germanium that crystallizes out of the melt will crystallize out in the body of the alloy rather than onto the base material. The advantage of this is that the alloy may then be readily removed by etching with concentrated hydrochloric acid or some similar agent. This procedure will leave only the thin region 15.

The lead 21 may be connected to the ohmic connection 20 by soldering directly to the region 15 or a thin, transparent, conductive film 28, such as gold, may be evaporated or placed on the region 15 to provide good electrical contact with it. Then the lead 21 may be soldered to the gold layer 28 to provide an ohmic connection 20 to the layer 15.

In the case where P-type silicon is used for the base material, the alloy may use lithium for the N-type impurity and aluminum for the P-type impurity. The process is then similar to that described for P-type germanium.

It is also possible to make a similar device using N-type base material. For this case, the composition of the indium-arsenic alloy is such that the concentration of the arsenic in the germanium recrystallized from the melt is about 1.2 times the concentration of the indium in the same material. The treatment of the unit is much the same as in the case of P-type base material, but the action is somewhat different. During the diffusion time, the arsenic and indium diffuse from the redeposited layer into the base material. In this case the arsenic does not change the conductivity type, but rather in the process of diffusion a region or layer in the redeposited material is depleted of arsenic to such an extent that the indium predominates and causes P-type conductivity. Nearer the alloy interface in the redeposited layer, however, the arsenic has not become depleted and predominates over the indium causing N-type conductivity. Hence an N–P–N conductivity configuration is produced. With the exception of alterations of times and temperatures of alloying and diffusion to produce the desired conditions in the unit, the manufacturing operations may be the same as with the P-type base material units.

A unit using N-type base material might also be made in a manner completely analogous to that already described for P-type base material. In this case, arsenic might be used as the slow diffusing N-type impurity and copper used for the rapidly diffusing P-type material.

Although I have described the above process for the manufacture of the photoelectric device, my invention is not limited to this process. It is also suggested that to obtain the desired thin intermediate layer which operates as the current amplifying barrier in the hook-type device an etching process may be utilized and simple alloying procedures be used to obtain a suitable large area photoelectric device.

Figure 3:
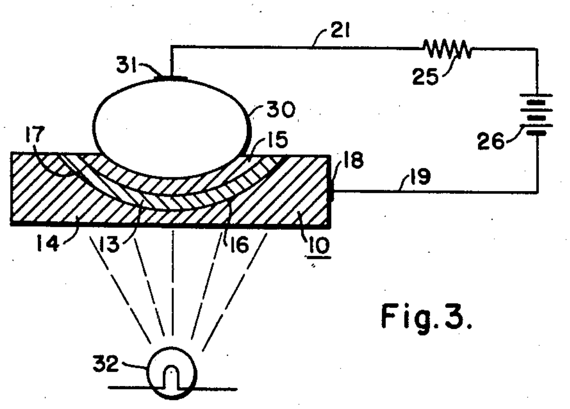
Fig. 3 is a sectional view of a structural modification of the photocell shown in Figs. 1 and 2.

Referring in detail to Fig. 3, I have shown another form of photocell. The photocell is comprised of a base layer 14, an intermediate layer 13 and a collector layer 15. This device was obtained by the process previously mentioned with the exception that the alloy glob is not removed. It is not necessary to take any particular precautions with the cooling procedure after the diffusion is completed. It is also advantageous to etch the device after the heat treatment to remove any material that might be shorting the junctions at the surface. A connector 31 is soldered to the alloy material 30 so as to provide an ohmic connection to the semiconductive region 15. A second connector 18 is provided to the base region 14 of the semiconductive device 10 so as to provide an ohmic connection. The light is directed from the source 32 so as to impinge upon the base region 14. The battery 26 is connected to properly bias a P–N–P device.

The length and width of the semiconductive wafer 10 is not critical and is usually of the order of one-quarter inch in the form of a square. The thickness of the wafer 10 is also not of a critical nature and is usually of the order of .01 inch. The thickness of the layer 14 or 15 upon which the light impinges is of a fairly critical nature and should be of the order of .005 inch to .001 inch. This dimension is critical due to the fact that the hole-electron pairs produced in the region or layer 14 or 15 by the light impinging on the layer 15 or 14, shall not recombine before the minority carriers, holes in the case where the layer 14 or 15 is N-type, are permitted to diffuse to the P–N junction 16 or 17 formed between the region upon which the light impinges and the intermediate region 13. The thickness of the intermediate layer 13 is of a critical nature in order to obtain a high amplification from the device. The thickness of this intermediate region 13 should be of the order of .0001 inch. The other exterior region 15 or 14 upon which the light does not fall is not of a critical dimension and may be of any practical thickness. It should also be pointed out that the resistivity of the regions 13, 14, 15 is also critical. The region 14 or 15 upon which the light falls should be of a low resistivity of the order of .01 ohm-centimeter, while the intermediate layer 13 should also be of a low resistivity of the order of .01 ohm-centimeter. The exterior region 14 or 15 upon which the light does not fall may be of any type resistivity.

In the operation of the device shown in the drawing, the radiation which may be either light or atomic radiations, falls on the region 14 or 15 where it produces hole electron pairs. In the case where the region 15 is of an N-type conductivity, as in Fig. 2, the electrons will largely drift to the electrode 18 connected to the base 14 and participate no further in the action. The action of the holes, the minority carriers, generated by the light, on the other hand, is more important. These holes will diffuse towards the P–N junction 17, and will be swept across the junction 17 in a favorable direction due to the voltage impressed on the device by the battery 26. Once the holes are within the intermediate region 13, they are lightly held by the retarding potential across the other P–N junction 16. The presence of these lightly trapped positive holes lowers the potential of the region 13 for the excess electrons in the other end region 14, thus permitting a greatly enhanced electron flow. This is essentially the hook collector action as described in the previously mentioned literature. The operation of the N–P–N device shown in Fig. 3 is similar except the action of the holes and electrons is reversed.

The device described herein has been utilized to operate a relay having a 2000 ohm coil as the impedance 25, and a 6-volt battery as the source 26 when illuminated by a flashlight approximately six feet away.

While I have shown my invention in several forms, it will be obvious to those skilled in the art that it is not so limited, but is susceptible of various other changes and modifications without departing from the spirit and scope thereof.

I claim as my invention:

1. A hook collector phototransistor device comprising a wafer of semiconductive material having a thickness of about 0.010 inch and having discrete contiguous regions along its thickness dimension, a first N-type region of uniform thickness of from about 0.005 inch to 0.001 inch, a P-type region of uniform thickness of about 0.0001 inch, an intermediate first P–N junction formed between said first N-type region and said P-type region, a second N-type region with an intermediate second P–N junction formed between said P-type region and said second N-type region, means for connecting a first ohmic connection to said first N-type region, means for connecting a second ohmic connection to said second N-type region, said first N-type region having a surface upon which light may impinge and means for exposing said first N-type region to light so that for each quantum of light absorbed by said first N-type region a large number of charge carriers will flow through portions of said device during operation.

2. A hook collector phototransistor device comprising a wafer having therein an intermediate zone of one type conductivity and of a uniform thickness of about 0.0001 inch, said intermediate zone being contiguous with a pair of zones of opposite conductivity, an ohmic connection to each of said pair of zones of opposite conductivity, one of said pair of zones of opposite conductivity having a uniform thickness and a surface upon which light may impinge, and means for exposing said one zone of opposite conductivity to light so that for each quantum of light absorbed by said one zone of opposite conductivity a large number of charge carriers will flow through portions of said device during operation.

3. The method of making a hook-collector phototransistor comprising the steps of etching the surface of a first-conductivity-type semiconductive material, placing an alloy of a first-conductivity-type impurity material and a second conductivity-type impurity material on said etched surface, said second-conductivity-type impurity material having a diffusion rate in said semiconductive material greater than the diffusion rate of said first-conductivity-type impurity material, melting the alloy and dissolving some of the adjacent semiconductive material in the molten alloy, cooling the molten alloy to an elevated temperature slightly below the melting point of the alloy, and maintaining the alloy at the elevated temperature, thereby diffusing said impurity materials predetermined distances into said semiconductive material at an elevated temperature, cooling said alloy to room temperature at a first rate, cooling said semiconductive material at a rate slower than said first rate so that said semiconductive material is at a higher temperature than said alloy during said cooling step, and removing said alloy from the surface of said semiconductive material.

References Cited in the file of this patent

UNITED STATES PATENTS

| | | |
|---|---|---|
| 2,644,852 | Dunlap | July 7, 1953 |
| 2,653,085 | Wynne | Sept. 22, 1953 |
| 2,672,528 | Shockley | Mar. 16, 1954 |
| 2,713,132 | Mathews et al. | July 12, 1955 |
| 2,725,315 | Fuller | Nov. 29, 1955 |